United States Patent
Budd

[15] 3,656,922
[45] Apr. 18, 1972

[54] MANUFACTURE OF GLASS CONTAINERS

[72] Inventor: Sydney Maurice Budd, Edgware, England

[73] Assignee: United Glass Limited, Staines, Middlesex, England

[22] Filed: Mar. 30, 1970

[21] Appl. No.: 23,996

[52] U.S. Cl. .................................. 65/30, 65/60, 65/111, 65/117, 65/119
[51] Int. Cl. ................................ C03c 15/00, C03c 17/00
[58] Field of Search .................... 65/60, 30, 111, 117, 119

[56] References Cited

UNITED STATES PATENTS

| | | | |
|---|---|---|---|
| 3,498,819 | 3/1970 | Lyle et al. | 65/60 X |
| 3,516,811 | 6/1970 | Gatchet et al. | 65/60 |
| 3,352,707 | 11/1967 | Rickard | 65/60 X |
| 3,352,708 | 11/1967 | Lyon et al. | 65/60 X |
| 3,161,537 | 12/1964 | Dettre et al. | 65/60 X |
| 3,420,693 | 1/1969 | Scholes | 65/60 X |
| 3,425,859 | 2/1969 | Steigelman | 65/60 X |
| 3,455,722 | 7/1969 | Kushihashi | 65/60 X |
| 3,014,815 | 12/1961 | Lely et al. | 65/60 X |
| 2,809,124 | 10/1957 | Rick | 65/60 X |
| 3,004,863 | 10/1961 | Gray et al. | 65/60 X |

Primary Examiner—Frank W. Miga
Attorney—Cushman, Darby & Cushman

[57] ABSTRACT

A method of manufacturing glass containers, e.g., glass bottles, comprises the steps of:

a. forming the containers in a forming machine;

b. immediately thereafter, and while they are still hot from the forming, contacting the containers with a metal-organic compound in liquid form and of high thermal stability such that substantially no decomposition of the metal-organic compound takes place on contact;

c. subjecting the containers treated as in (b) to a heat treatment to cause the metal-organic compound to react with the glass and form a diffuse layer of reaction product within the glass surface; and d. treating the containers while at a temperature of at least 450° with a metal compound in liquid or vapor form which decomposes rapidly on contact with the containers at the contacting temperature to produce a surface film of metal oxide.

Tin and titanium compounds are mentioned as suitable reagents, and steps (c) and (d) may take place simultaneously.

12 Claims, No Drawings

MANUFACTURE OF GLASS CONTAINERS

This invention relates to the manufacture of glass containers, such as bottles, jars, tumblers, tableware and the like and is especially concerned with a method of manufacturing glass containers having substantial strength.

A number of methods have been proposed hitherto for improving the strength of glass containers. These include methods in which the glass containers are treated with a metal compound in liquid or vapor form immediately after they have been formed, and before they have been annealed. In one such method the hot containers are contacted with the vapor of a metal compound which rapidly decomposes on contact with the hot glass to produce a metal oxide film on the glass. This metal oxide film serves to protect the glass, after it has been cooled, from scratching and abrasion, and thereby prevents the loss of strength which would otherwise occur in an untreated bottle subjected to scratching and abrasion. Although treating a container in this way does not make it stronger at the point of manufacture, it does make it stronger in service, since it prevents, to a substantial extent, the container losing in use its original strength.

In another known method glass containers are contacted, immediately after formation, with a liquid metal-organic compound. They are then passed into the annealing lehr wherein decomposition and reaction between the metal-organic compound and the glass surface occurs, giving rise to a diffused layer of reaction product in the glass surface. A glass container manufactured in this way has increased strength at the point of manufacture.

In another method of improving the strength of a glass container, which is a refinement of the last-mentioned method, the liquid metal-organic compound is one which partially decomposes on contact with the hot glass to produce a metal compound which reacts rapidly with the hot glass to provide a metal oxide film, while the remainder reacts slowly with the glass while the glass is being annealed to produce a diffused layer of reaction product within the glass surface.

It is the object of the present invention to provide a method of manufacturing glass containers which are substantially stronger at the point of manufacture than are glass containers manufactured hitherto, both by conventional method and by methods involving intermediate treatment operations such as those outlined above.

According to the invention a method of manufacturing glass containers comprises the steps of:
a. forming the containers in a forming machine;
b. immediately thereafter, and while they are still hot from the forming, contacting the containers with a metal-organic compound in liquid form and of high thermal stability such that substantially no decomposition of the metal-organic compound takes place on contact;
c. subjecting the containers treated as in (b) to a heat treatment to cause the metal-organic compound to react with the glass and form a diffuse layer of reaction product within the glass surface; and
d. treating the containers while at a temperature of at least 450°C with a metal compound in liquid or vapor form which decomposes rapidly on contact with the containers at the contacting temperature to produce a surface film of metal oxide.

The glass containers may subsequently be further treated, while at a temperature of 80° – 180°C, with an aqueous solution or emulsion of a polyoxyethylene glycol, a derivative thereof, or polyethylene. We have found that by means of this method glass containers may be produced which are substantially stronger than containers manufactured in accordance with the prior methods discussed above.

In essence the method of the invention may comprise three distinct stages following the initial forming step (a). In the first stage, step (b), the formed glass containers are treated with a metal-organic compound after which they are heat-treated in the second stage, so as to produce a diffuse layer of reaction product within the glass surface. Clearly, it is necessary to use for this purpose a metal compound which will permit such reaction to occur, and we have found that certain compounds of tin or titanium are suitable for this purpose. These materials, dissolved in a suitable solvent, are suitably applied to the glass containers immediately after they leave the forming machine. Preferably the containers are transferred to a conveyor over a part of which is mounted a tunnel provided with a spray or sprays to which a constant supply of liquid material is pumped. Preferably at least two sprays are used, the flow rate through each spray being in the range 2 – 12 mls per minute.

After passing through the application tunnel it is necessary, as the second stage, to heat-treat the containers to ensure maximum reaction of the applied metal-organic material with the glass, so as to obtain a diffuse layer. In practice this may be accomplished by passing the containers from the conveyor into an annealing lehr or other annealing enclosure where the "hot spot" temperature, i.e. the temperature at the hot end, is at least 20°C higher than the annealing point of the glass. For most container glasses a hot spot temperature of 575°C is suitable.

A suitable metal-organic compound of high thermal stability for use in the first stage of the method is a material prepared by reacting a tin tetrahalide, e.g. tin tetrachloride, with a lower alcohol, e.g. isopropanol, such that at no time during the reaction is the proportion of tin tetrahalide to alcohol greater than 33 percent w/w. The final material may contain between 1 and 10 percent by weight of tin, and preferably will contain about 4 percent w/w of tin. Another suitable material is prepared by reacting titanium tetrachloride with a lower alkoxide of titanium, e.g. titanium tetrabutoxide, in alcohol solution such that the titanium represents between 1 and 10 percent by weight of the solution.

In the third stage of the method according to this invention, i.e. step (d), the glass container surface is provided, additionally to the diffuse layer provided by the first and second stages, with a metal oxide non-diffuse layer. This is accomplished by treating the glass while it is at a temperature above 450°C with a metal compound which reacts with the hot glass to give a metal oxide film. Suitable materials for this purpose include tin chloride vapor or titanium tetrachloride. Application of the third stage material to the glass containers may be made by passing vapor of the material into the annealing lehr at a point where the temperature of the containers is not less than 450°C. In such a case, it will be appreciated that the second and third stages of the method, i.e. steps (c) and (d), take place simultaneously.

The conditions of application of the third stage material will normally depend upon the material used and on the temperature at which it is applied. Such conditions should ensure that the final annealed, cooled container is not unduly iridescent, but possesses a surface which cannot readily be abraded by contact with a similarly treated surface. For example the annealing lehr may be equipped with sprays similar to those suggested for the first stage, to which is pumped sufficient material to create a mist or atmosphere of the material in a particular section of the lehr. The containers will be contacted with the material as they pass through this section of the lehr, and the material, upon reaction with the hot glass, will produce a metal oxide coating on the surfaces of the containers.

Preferably, when the containers have cooled to a temperature in the range 80° – 180°C, a further treatment is applied, and this consists in the application to the annealed containers of a film of a polyoxyethylene glycol of high molecular weight or a monocarboxylic acid ester of such a polyethylene glycol, or of polyethylene. The material is suitably applied by spraying the containers with a solution or dispersion of the organic compound in water, and preferably is applied to the glass containers while they are at a temperature within the range 100° – 150°C. Suitable materials for this final treatment include polyethylene glycol marketed by Union Carbide Co. under the names Carbowax 1500, Carbowax 4000, and Carbowax 6000, a polyethylene glycol mono-stearate marketed by Atlas Chemicals under the name MYRJ 51/S, and polyethylene emulsions marketed by Owens Illinois Inc. under the name Duracote and by Valchem Ltd. under the name Valsof.

The following Examples are given for the purpose of illustrating the invention.

Example 1

Glass bottles of oval shape were manufactured on a forming machine and passed on a conveyor through a hood wherein were situated two spray heads, one on either side of the conveyor. The bottles were subjected to treatment using a liquid prepared by reacting tin chloride with isopropyl alcohol, the final product containing 4 percent w/w of tin, the flow rate through each spray being 10 mls. per minute. After emerging from the hood the bottles were passed into an annealing lehr wherein was maintained an atmosphere containing stannic chloride vapor.

After annealing the bottles were clear and free from surface film or irridescence. Bursting pressure tests gave a mean of 132 p.s.i., compared with 48 p.s.i. obtained on untreated bottles, 90 p.s.i. on bottles treated in the hood but not in the annealing lehr, and 70 p.s.i. on bottles treated in the annealing lehr but not in the hood.

Example 2

Cylindrical bottles were manufactured and treated as described in Example 1, except that after annealing they were treated with a 0.1 percent aqueous solution of polyethylene glycol of molecular weight approximately 4000. This latter treatment was carried out using a single travelling spray head situated above the bottles, and the flow rate and speed were set such as to provide a coating on the bottles containing between 1 and 5 µg polyethylene glycol per cm$^2$ of glass surface.

The bottles so obtained were given a standard abrasion by causing two like treated bottles to be scratched together under a force of 50 lbs weight. The scratched bottles were then impacted such that on increasing the impact level fracture occurred originating at a point through which the scratch passed. The treated bottles withstood a mean impact velocity of 64 inches per second, compared with 45 inches per second for untreated bottles, 53 inches per second for bottles treated in the hood but not in the annealing lehr, and 47 inches per second for bottles treated in the annealing lehr but not in the hood.

What we claim is:

1. A method of manufacturing glass containers comprising the steps of:
   a. forming the glass containers in a forming machine;
   b. immediately thereafter, and while the glass containers are still hot from the forming step, contacting the glass containers with a metal-organic compound in liquid form and of high thermal stability such that substantially no decomposition of the metal-organic compound takes place on contact with the hot glass containers, said metal-organic compound selected from tin and titanium compounds prepared by reacting a tin tetrahalide with a lower alcohol or by reacting titanium tetrachloride with a lower alkoxide of titanium;
   c. subjecting the containers treated as in (b) to a heat treatment to react the metal-organic compound with the surface of the glass and form a diffuse layer of reaction product within the glass surface, the temperature during the heat treatment being at least 20°C higher than the annealing temperature of the glass; and
   d. treating the containers while at a temperature of at least 450°C with a metal compound, in liquid or vapor form, which decomposes rapidly on contact with the containers to produce a surface film of metal oxide, said metal compound being selected from the group consisting of tin chloride and titanium tetrachloride.

2. A method as claimed in claim 1 wherein the heat treatment recited in step (c) is an annealing treatment.

3. A method as claimed in claim 1 wherein steps (c) and (d) take place simultaneously.

4. A method as claimed in claim 1 wherein the metal-organic compound is prepared by reacting tin tetrachloride with a lower alcohol.

5. A method as claimed in claim 4 wherein the metal-organic compound is prepared by reacting tin tetrachloride with isopropanol such that at no time during the reaction is the proportion of tin tetrachloride to isopropanol greater than 33 percent by weight.

6. A method as claimed in claim 1 wherein the metal-organic compound is prepared by reacting titanium tetrachloride with a lower alkoxide of titanium.

7. A method as claimed in claim 6 wherein titanium tetrachloride is reacted with titanium tetra-butoxide in alcoholic solution, the solution containing from 1 to 10 percent by weight of the metal-organic compound measured as titanium.

8. A method as claimed in claim 1 in which the metal compound of step (d) is tin chloride in vapour form.

9. A method as claimed in claim 1 wherein the containers are cooled to a temperature within the range 80°–180°C after step (d) and then are further treated with polyethylene glycol, a derivative of polyethylene glycol, a polyoxyethylene glycol, a derivative of polyoxyethylene glycol, or polyethylene.

10. A method as claimed in claim 9 wherein the additional treatment is carried out when the containers are at a temperature between 100° and 150°C.

11. A method as claimed in claim 9 wherein the additional treatment comprises spraying the containers with a solution or emulsion of a polyethylene glycol mono-stearate.

12. A method of manufacturing glass containers comprising (a) forming the containers in a forming machine, (b) immediately thereafter, and while the glass containers are still hot from forming, (c) contacting the hot glass containers with a metal-organic compound in liquid form selected from tin and titanium compounds prepared by reacting a tin titrahalide with a lower alcohol or by reacting titanium tetrachloride with a lower alkoxide of titanium, (d) annealing the thus treated containers, and during annealing, and while the containers are at a temperature of at least 450°C, (e) contacting the containers with a metal compound, in liquid or vapor form, selected from the group consisting of tin chloride and titanium tetrachloride.

* * * * *